(12) United States Patent
Saeki et al.

(10) Patent No.: US 6,991,756 B2
(45) Date of Patent: Jan. 31, 2006

(54) HEAT EXCHANGE APPARATUS FOR A METAL MOLD

(75) Inventors: Tatsuhiko Saeki, Kanagawa (JP); Seiichi Watanabe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 226 days.

(21) Appl. No.: 10/284,311

(22) Filed: Oct. 31, 2002

(65) Prior Publication Data

US 2003/0085491 A1    May 8, 2003

(30) Foreign Application Priority Data

Nov. 7, 2001    (JP) .............................. 2001-342130

(51) Int. Cl.
*B29C 45/73* (2006.01)

(52) U.S. Cl. .............................. 264/40.6; 264/328.16; 425/144; 425/548; 425/552

(58) Field of Classification Search ............... 264/40.6, 264/328.16; 425/143, 144, 548, 552
See application file for complete search history.

(56) References Cited

U.S. PATENT DOCUMENTS

| | | | | |
|---|---|---|---|---|
| 4,548,773 A | * | 10/1985 | Suh et al. | 264/40.6 |
| 5,725,891 A | * | 3/1998 | Reid, Jr. | 425/407 |

FOREIGN PATENT DOCUMENTS

| | | |
|---|---|---|
| JP | 03-244512 | * 10/1991 |
| JP | 2001-009839 | 1/2001 |

* cited by examiner

*Primary Examiner*—Jill L. Heitbrink
(74) *Attorney, Agent, or Firm*—Sughrue Mion, PLLC

(57) ABSTRACT

A heat exchange apparatus for a metal mold is provided, which includes a heat exchange passage provided for the metal mold, a first supply unit for supplying hot heat carrier to the heat exchange passage and a second supply unit for supplying cold heat carrier to the heat exchange passage. The heat exchange apparatus performs heat exchange for the metal mold by supplying the hot heat carrier and cold heat carrier to the heat exchange passage switching alternately. And the heat exchange apparatus has a feature that it includes an air supply unit for supplying air to the heat exchange passage so that the heat carriers are purged when the hot heat carrier and cold carrier are switched.

6 Claims, 10 Drawing Sheets

HEAT EXCHANGE APPARATUS FOR A METAL MOLD

FIELD OF THE INVENTION

The present invention relates to a heat exchange apparatus for heating and cooling of a metal mold which is used for blow molding, injection molding and the like, particularly to one which performs heat exchange for the metal mold by supplying heat carriers to a heat exchange passage provided for the metal mold.

BACKGROUND OF THE INVENTION

A metal mold for resin molding (hereinafter referred to as metal mold), which is used for molding of a thermoplastic resin, is generally given temperature control by heating and cooling depending on the cure temperature of resin to be molded for a product. In this molding, a resin product with better accuracy tends to come out as the temperature of metal mold rises while a melted resin material is supplied into a cavity of the metal mold, since the flowability of melted resin and the transfer of metal mold shape are promoted as the temperature rises. However, when the temperature of metal mold is set to be high, it takes a long period of time to cool down the product as low as it can be accessed to extract, thereby resulting in a problem of time-consuming molding cycle.

A heat exchange apparatus, which is capable of controlling the temperature of a metal mold high and low during molding of a product, has been employed for conventional blow molding and injection molding so that both good transfer of the metal mold shape and a reduction in the molding time cycle can be attained. Examples for this type of heat exchange apparatus are: one which performs heat exchange by supplying hot and cold carriers alternately to a heat exchange passage provided for a metal mold, and the other which employs a heater instead of the hot heat carrier and a cold heat carrier for performing heat exchange.

Though, the conventional heat exchange apparatus, which employs alternate supplying of hot and cold heat carriers, has not yet solved a problem that energy efficiency falls due to the occurrence of a mixture of one heat carrier (e.g. hot heat carrier) remaining in a heat exchange passage and the other heat carrier (e.g. cold heat carrier) supplied anew. On the other hand, the other conventional one with a heater and a cold heat carrier has a problem that the heater unnecessarily supplies heat to the cold heat carrier, which remains in a heat exchange passage, thereby worsening energy efficiency.

SUMMARY OF THE INVENTION

The object of the present invention is to provide a heat exchange apparatus for a metal mold which is capable of improving energy efficiency by preventing heat carriers from remaining in a heat exchange passage in the metal mold.

The present invention provides a heat exchange apparatus for a metal mold which includes a heat exchange passage provided for the metal mold, a first supply unit for supplying hot heat carrier to the heat exchange passage, a second supply unit for supplying cold heat carrier to the heat exchange passage, a plurality of valves and a plurality of pipes. The heat exchange apparatus performs heat exchange for the metal mold by supplying the hot and cold heat carriers to the heat exchange passage switching alternately. And the heat exchange apparatus has a feature that it includes air supply units for supplying air to the heat exchange passage so that the heat carriers are purged when supply of the hot and cold heat carriers is switched.

According to the present invention, when the supply unit for hot heat carrier is put into operation, the metal mold is heated up by the hot heat carrier supplied to the heat exchange passage. Next when a switching from high to cold heat carrier is performed, the air supply unit is put into operation while the supply unit for hot heat carrier is stopped. The air supplied by this air supply unit purges the hot heat carrier remaining in the heat exchange passage of metal mold. Subsequently, the air supply unit is stopped and the supply unit for cold heat carrier is then put into operation to supply the cold heat carrier to the heat exchange passage, thereby cooling the metal mold.

DESCRIPTION OF THE PREFERRED EMBODIMENTS

1. First Embodiment

Figure 1:
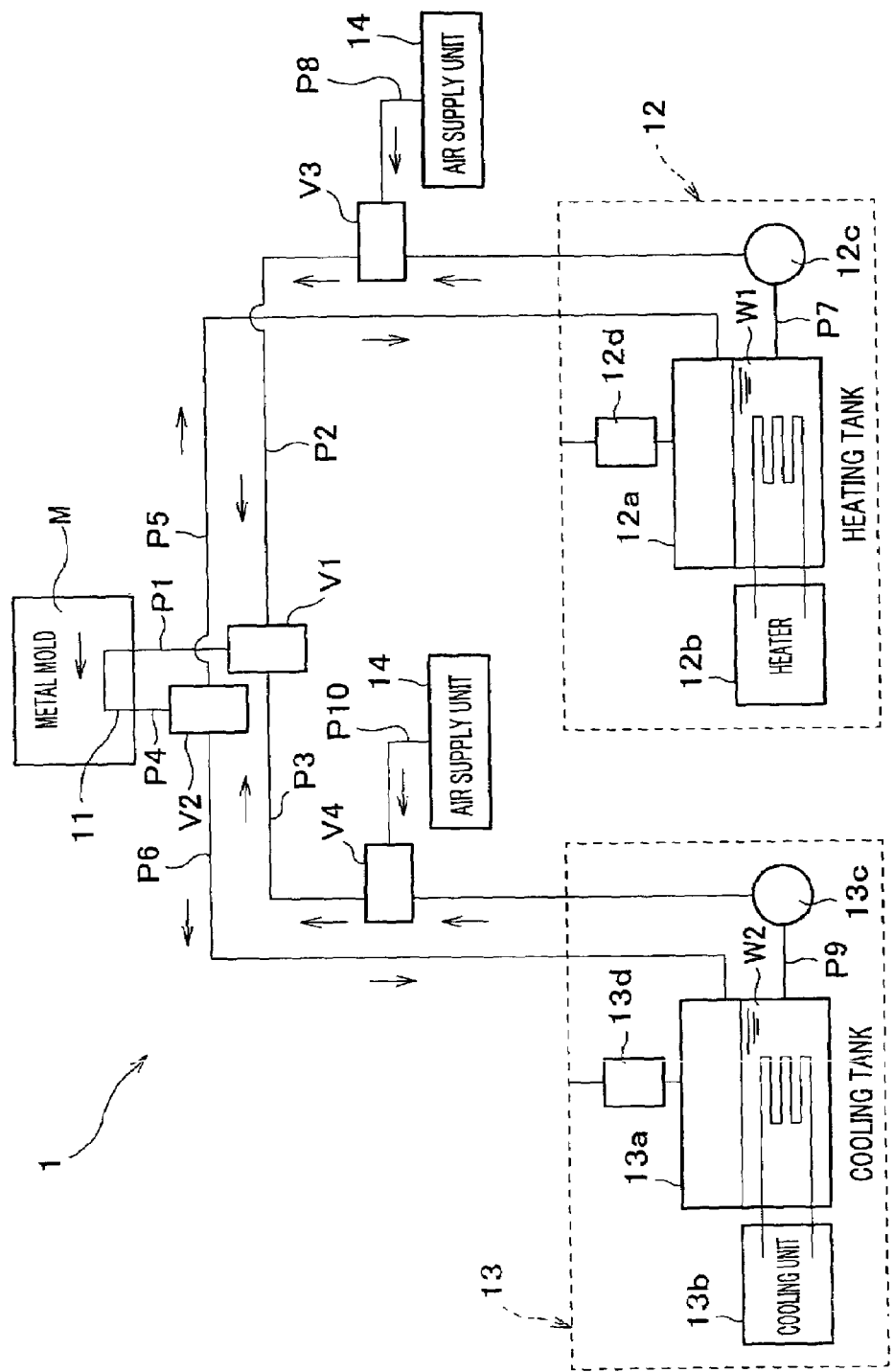
FIG. 1 is a drawing showing a structure of the heat exchange apparatus for a metal mold according to a first embodiment.

An exemplary first embodiment of the heat exchange apparatus for a metal mold according to the present invention will now be described referring to the accompanying drawings. FIG. 1 is a drawing showing a structure of the heat exchange apparatus for a metal mold according to the first embodiment of the present invention.

As shown in FIG. 1, a heat exchange apparatus 1 includes a heat exchange passage 11 provided for a metal mold M, a supply unit 12 for hot heat carrier, a supply unit 13 for cold heat carrier and air supply units 14 for compressed air. Further, the heat exchange apparatus 1 includes supply pipes P1, P2 and P3 through which heat carriers are supplied to the metal mold M, discharge pipes P4, P5 and P6 through which they are discharged and four pieces of three-way valves V1–V4.

The supply pipe P1 is connected to one end of the heat exchange passage 11 and the discharge pipe P4 to the other end as well. This supply pipe P1 is connected both to the supply pipe 2 of supply unit 12 and to the supply pipe P3 of supply unit 13 through the three way valve V1. On the other hand, the discharge pipe P4 is connected both to the discharge pipe 5 of supply unit 12 and to the discharge pipe P6 of supply unit 13 through the three way valve V2.

The supply unit 12 includes a heating tank 12a for storing water W1 serving as a hot heat carrier and a heater 12b which heats up the water W1 in the heating tank 12a. A pump 12c for supplying the heated water W1 to the metal mold M is connected to a lower portion of the heating tank 12a through a pipe P7 and a pressure control valve 12d for controlling the tank pressure is connected to a top of the heating tank 12a. The supply pipe P2 is connected to the pump 12c and the discharge pipe P5 is connected to an upper portion of the heating tank 12a. The three-way valve V3, to which the air supply unit 14 is connected through a pipe P8, is connected to the supply pipe P2 downstream the pump 12c.

The supply unit 13 includes a cooling tank 13a for storing water W2 serving as a cold heat carrier and a cooling unit 13b which cools down the water W2 in the cooling tank 13a. A pump 13c for supplying the cooled water W2 to the metal mold M is connected to a lower portion of the cooling tank 13a through a pipe P9 and a pressure control valve 13d for controlling the tank pressure is connected to a top of the cooling tank 13a. The supply pipe P3 is connected to the pump 13c and the discharge pipe P6 is connected to an upper portion of the cooling tank 13a. The three-way valve V4, to which the air supply unit 14 is connected through a pipe P10, is connected to the supply pipe P3 downstream the pump 13c.

The steps of performing heat exchange for the metal mold M by the heat exchange apparatus 1 will be described.

Figure 2:
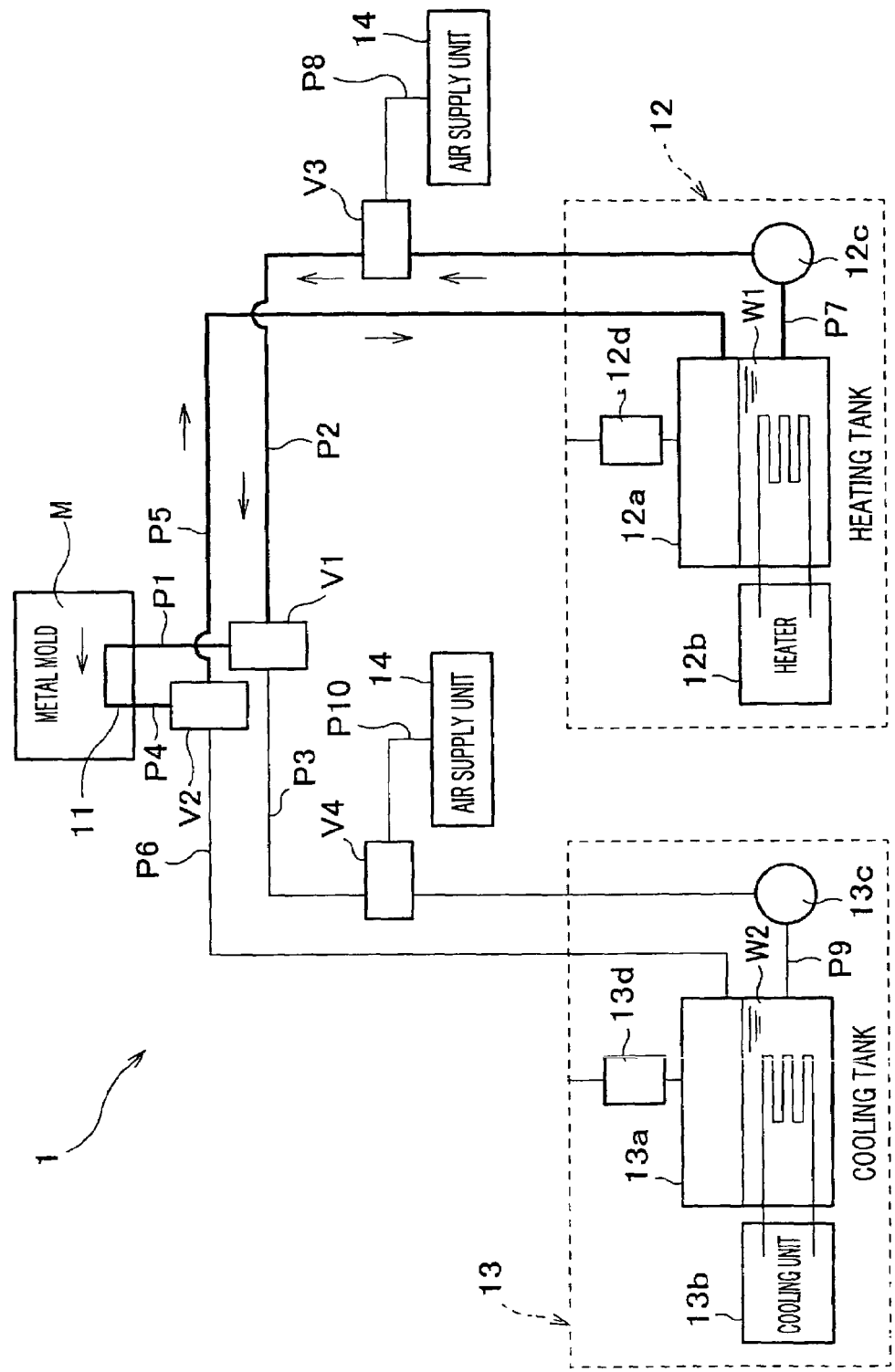
FIG. 2 is a drawing showing connection of pipes, valves, pumps and tanks while hot water is supplied to the heat exchange passage of a metal mold by a supply unit for hot heat carrier.

When the metal mold M is going to be heated up to a predetermined high temperature prior to filling of a melted resin to be injection-molded in a cavity of the metal mold M, the only valve of three-way valve V3, which is connected to the air supply unit 14, is closed and the only valves of three way valves V1 and V2, which are respectively connected to the supply unit 13, are also closed. And as shown in FIG. 2, the hot water W1 in heating tank 12a is supplied to the metal mold M through the pipes P7, P2 and P1 by the pump 12c of supply unit 12. This hot water W1 passes through the heat exchange passage 11 of metal mold M, thereby heating up the metal mold M, and then is circulated back to the heating tank 12a through the discharge pipes P4 and P5. After the metal mold M is heated up to a predetermined high temperature, the pump 12c is stopped and the melted resin is filled into the cavity of metal mold M from a gate (not shown).

Figure 3:
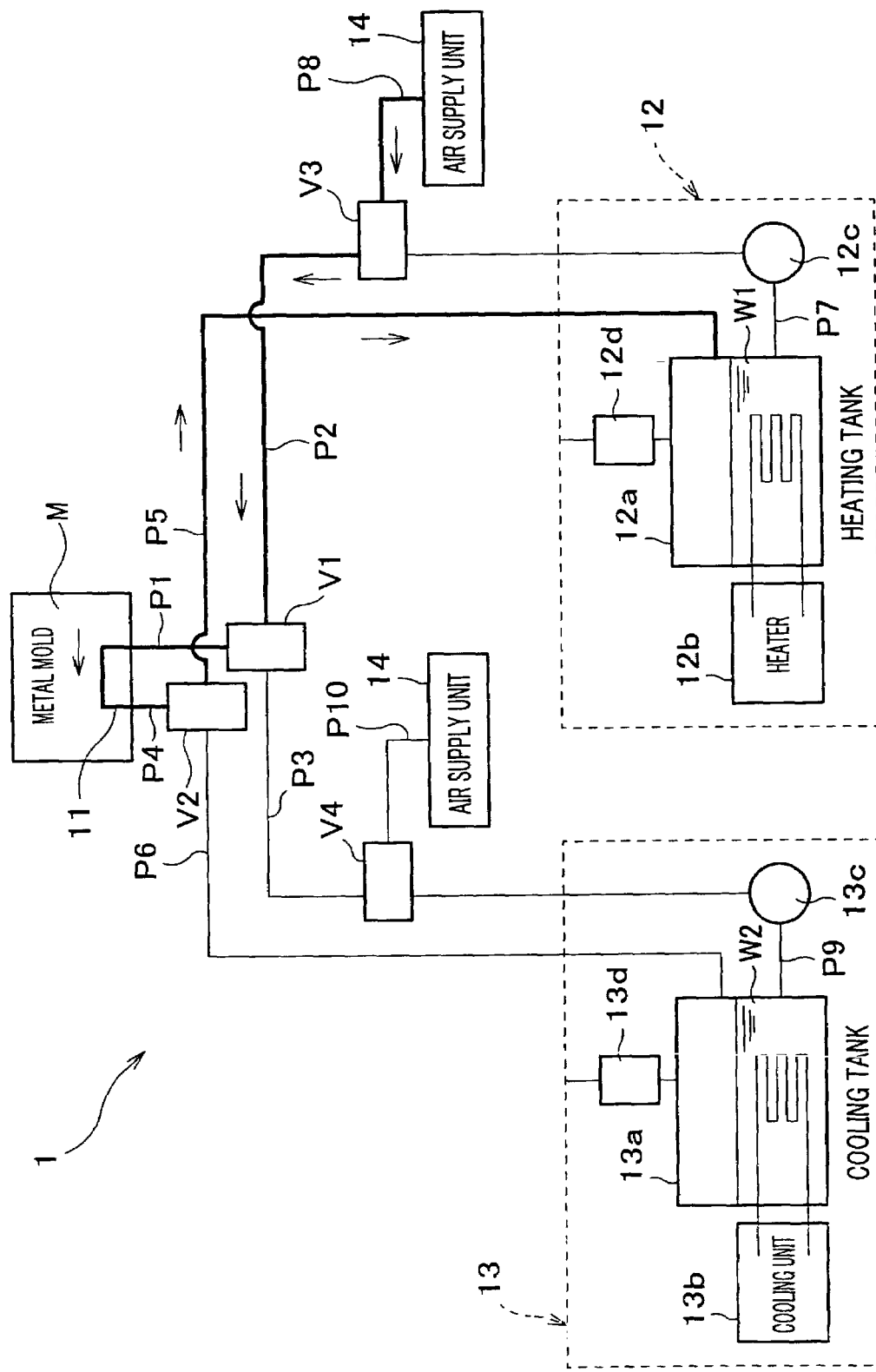
FIG. 3 is a drawing showing connection of pipes, valves, pumps and tanks while hot water remaining in a heat exchange passage is discharged by compressed air.

When the metal mold M filled with resin is subsequently going to be cooled down, the air supply unit 14 is put into operation after the aforementioned three-way valve V3 is switched so that the only valve connected to the supply unit 12 is closed. As shown in FIG. 3, the compressed air sent by the air supply unit 14 is discharged into the heating tank 12a through the pipes P8, P2 and P1, the heat exchange passage 11 and the discharge pipes P4 and P5. The compressed air thus forces the hot water W1 remaining in the heat exchange passage 11 etc. to move into the heating tank 12a. The pressure control valve 12d is accordingly released so that the pressure rise in the heating tank 12a due to the compressed air discharged thereinto can be controlled.

Figure 4:
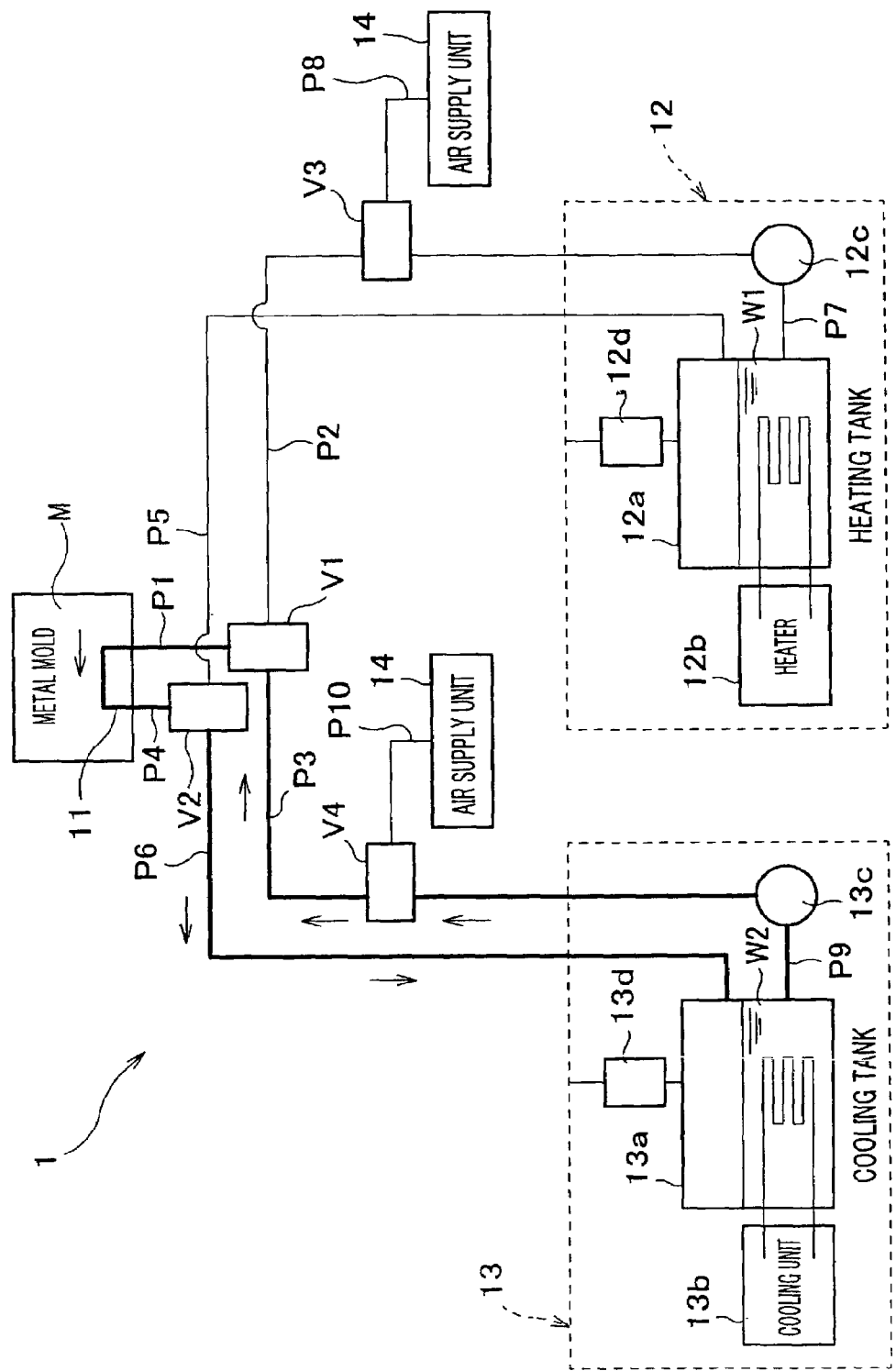
FIG. 4 is a drawing showing connection of pipes, valves, pumps and tanks while cold water is supplied to the heat exchange passage of a metal mold by a supply unit for cold heat carrier.

Next the three-way valves V1 and V2 are switched so that the only valves connected to the supply unit 12 respectively are closed. At the same time, another three-way valve V4 is switched so that the only valve connected to the air supply unit 14 is closed. And as shown in FIG. 4, the cold water W2 in cooling tank 13a is supplied to the metal mold M through the pipes P9, P3 and P1 by the pump 13c of supply unit 13. The cold water W2 passes through the heat exchange passage 11 of metal mold M, thereby cooling down the metal mold M, and then is circulated back to the cooling tank 13a through the discharge pipes P4 and P6. After the metal mold M is cooled down to a predetermined low temperature, the pump 13c is stopped and a product (cured resin) is then extracted from the metal mold M.

Figure 5:
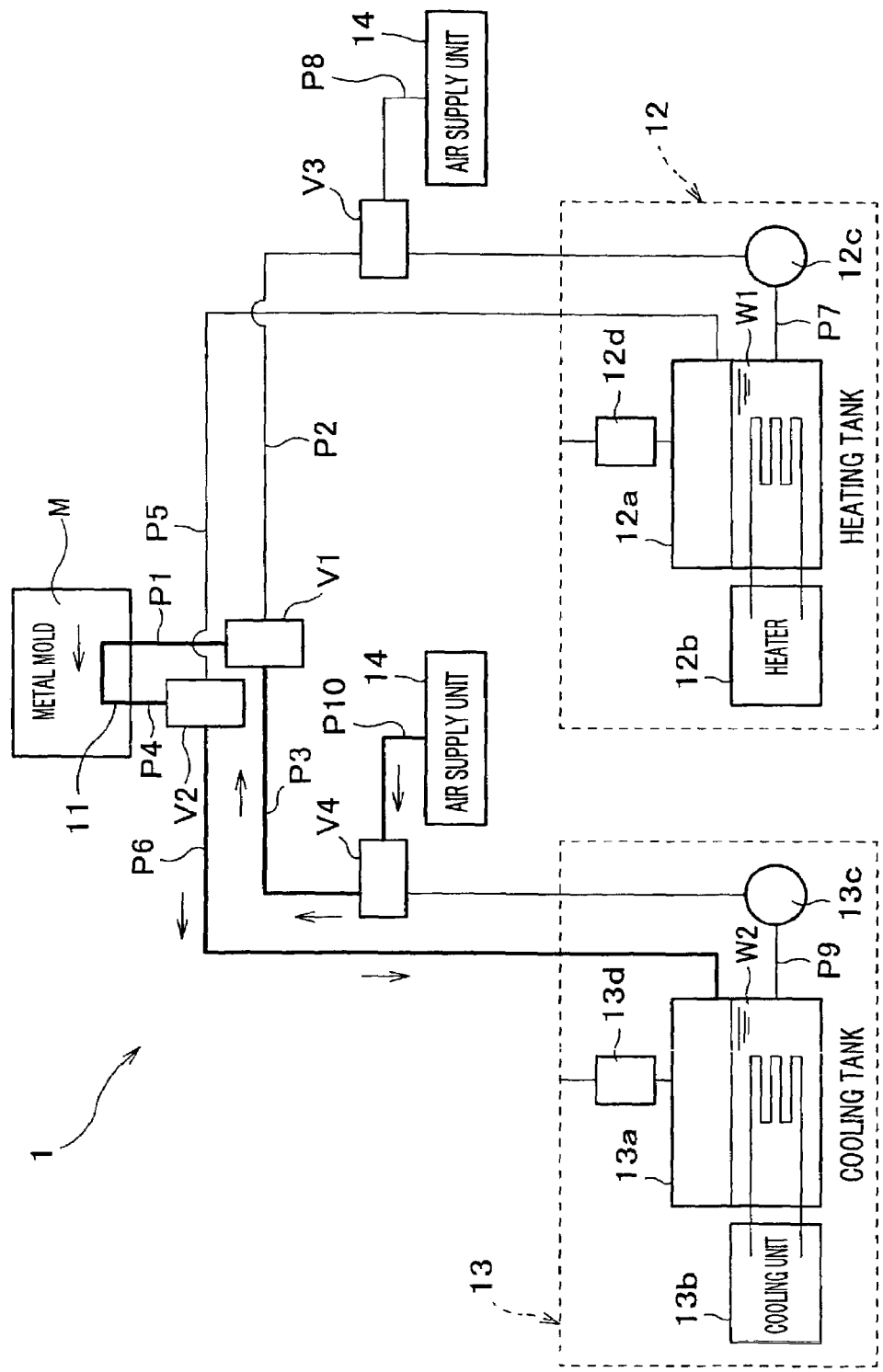
FIG. 5 is a drawing showing connection of pipes, valves, pumps and tanks while cold water remaining in a heat exchange passage is purged by compressed air.

Next when the metal mold M once cooled down to a predetermined low temperature is going to be heated up again, the three-way valve V4 is switched so that the only valve connected to the supply unit 13 is closed and the air supply unit 14 is then put into operation. As shown in FIG. 5, the compressed air sent by the air supply unit 14 is discharged into the cooling tank 13a through the pipes P10, P3 and P1, the heat exchange passage 11 and the discharge pipes P4 and P6. The compressed air thus forces the cold water W2 remaining in the heat exchange passages 11 etc. to move into the cooling tank 13a. The pressure control valve 13d is released to control a pressure rise in the cooling tank 13a due to the compressed air discharged thereinto.

Subsequently, the three-way valves V1 and V2 are switched so that the only valves connected to the supply unit 13 respectively are closed. And the three-way valve V3 is switched so that the only valve connected to the air supply unit 14 is closed (see FIG. 2). Repeating the steps described above, namely continuing alternate supply of the hot and cold water W1 and W2, heat exchange for the metal mold M can be performed for molding of a plurality of products.

According to the first embodiment, energy efficiency of heat exchange for the metal mold M can be improved since the water W1 or W2 remaining in the heat exchange passage 11 is discharged therefrom while switching supply of the hot and cold water W1 and W2.

It will now be appreciated from the foregoing description that the present invention is not limited to the exemplary embodiment discussed above and may be carried out in various modified forms.

Though the air supply units 14 are provided for the pipe P2 of supply unit 12 and the pipe P3 of supply unit 13 respectively in the first embodiment, the present invention is not limited to this arrangement. For example, the three-way valves V1, V3 and V4 described in the first embodiment may be omitted and a four-way valve may be disposed in place of the three-way valve V1. The pipes P1–P3 shown in the first embodiment are now connected to three junctions of the four-way valve newly introduced, respectively, and the air supply unit 14 is connected to the last fourth junction. This arrangement requires only one air supply unit 14, allowing a cost reduction in the heat exchange apparatus.

Though the pump 12c of supply unit 12 is stopped and the melted resin is filled in the cavity of metal mold M after the metal mold M is heated up to a predetermined high temperature in the first embodiment, the present invention is not limited to these steps. The hot heat carrier may be continued to supply to the heat exchange passage 11 of metal mold M without stopping the pump 12c even after completion of filling of the melted resin in the cavity. In this case, before the melted resin is filled in the cavity of metal mold M, the hot heat carrier heats up the metal mold M to a predetermined high temperature. After completion of filling of the melted resin, the hot heat carrier, which is continued to supply, can absorb the heat possessed by the melted resin. Subsequently, when the temperature of the hot heat carrier has reached a peak, the pump 12c is stopped and the hot heat carrier remaining in the heat exchange passage 11 etc. is purged into the heating tank 12a like the first embodiment. In controlling the supply unit 12 this way, the hot heat carrier can be heated up by a large amount of heat possessed by the melted resin, thereby allowing saved heating operation by the heater and the improvement of energy efficiency. In this connection, "when the temperature of the heat carrier has reached a peak" refers to an occasion the temperature has reached a predetermined high temperature.

The present invention is not limited to an arrangement described in the first embodiment, in which the water W1 supplied by the supply unit 12 for hot heat carrier is circulated back to the heating tank 12a and the water W2 supplied by the supply unit 13 for cold heat carrier is circulated back to the cooling tank 13a. It may be, for example, possible to switch the three-way valve V2 so that the water coming from the heat exchange passage 11 of metal mold M can be guided selectably to the heating tank 12a or cooling tank 13a depending on the temperature of water. In this case, a sensor for detecting the temperature of water coming from the heat exchange passage 11 is provided for the pipe P4 and sensors for detecting water temperature are provided for the tanks 12a and 13a, respectively. A control unit for switching the three-way valve V2 is added so that the water from the heat exchange passage 11 is circulated back to the heating tank 12a or cooling tank 13a based on a comparison of the detected water temperatures. In this arrangement, since the temperature of water circulated back to a tank is closer to that of the water in the tank, it can be easier to keep the temperature of water in the tank constant, thereby resulting in improvement of the energy efficiency.

It goes without saying that the present invention is not limited to water as a heat carrier, which is exemplified in the above descriptions like the first embodiment, but can employ other heat carriers such as oil selecting a desired one as the case may be.

Figure 10:
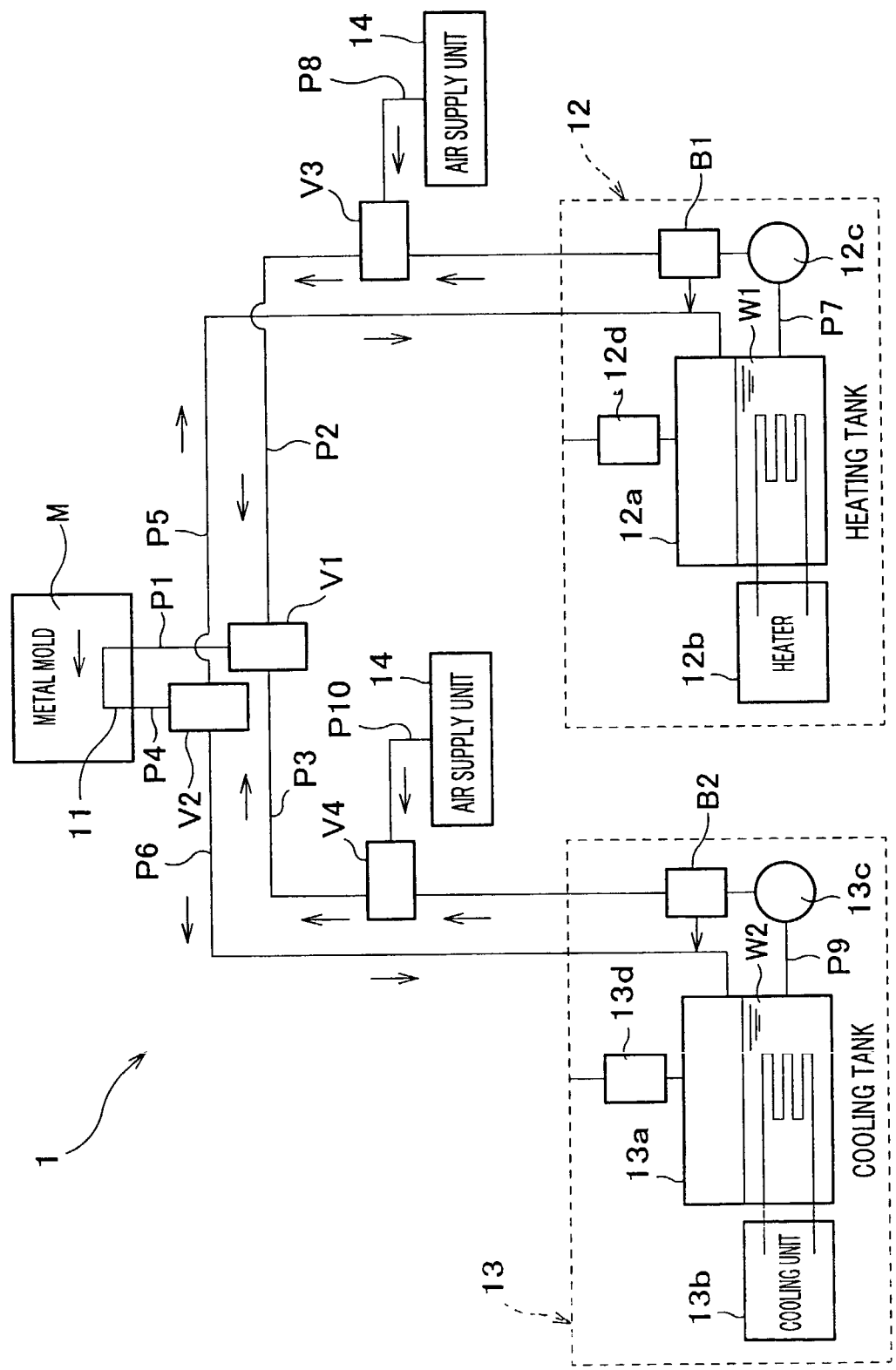
FIG. 10 is a drawing showing a structure of the heat exchange apparatus for a metal mold according to another embodiment.

The present invention is not limited to the first embodiment either, in which the pumps 12c and 13c for supplying fluid are stopped before purging the water W1 and W2 remaining in the heat exchange passage 11 by the air supply units 14. For example, as shown in FIG. 10, a bypass valve B1 near the pump 12c along the pipe P2 and the other bypass valve B2 near the pump 13c along the pipe P3 are provided so that heat exchange for the metal mold M can be performed without stopping of the pumps 12c and 13c. Specifically, the water W1 supplied by the pump 12c is bypassed back to the heating tank 12a by switching the bypass valve B1 before the water W1 remaining in the heat exchange passage 11 etc. is purged by the air supply unit 14 located in the same side as the supply unit 12. Similarly, the water W2 supplied by the pump 13c is bypassed back to the cooling tank 13a by switching the bypass valve B2 before the water W2 remaining in the heat exchange passage 11 etc. is purged by the other air supply unit 14 located in the same side as the supply unit 13. Since the pumps 12c and 13c can thus be operated continuously as a result of introduction of the bypass valves B1 and B2, biting of air by the pumps 12c and 13c can be prevented. Further, the easier control of heat exchange apparatus, which now can be performed by only switching of the bypass valves B1 and B2, can be attained.

2. Second Embodiment

A second embodiment of the heat exchange apparatus for a metal mold according to the present invention will be described. Since the second embodiment is a modification of the first embodiment, descriptions will be omitted for the items which are same as those of the first embodiment, bearing the same symbols. The referred drawing, FIG. 6 is a drawing showing a structure of the heat exchange apparatus for a metal mold according to the second embodiment.

Figure 6:
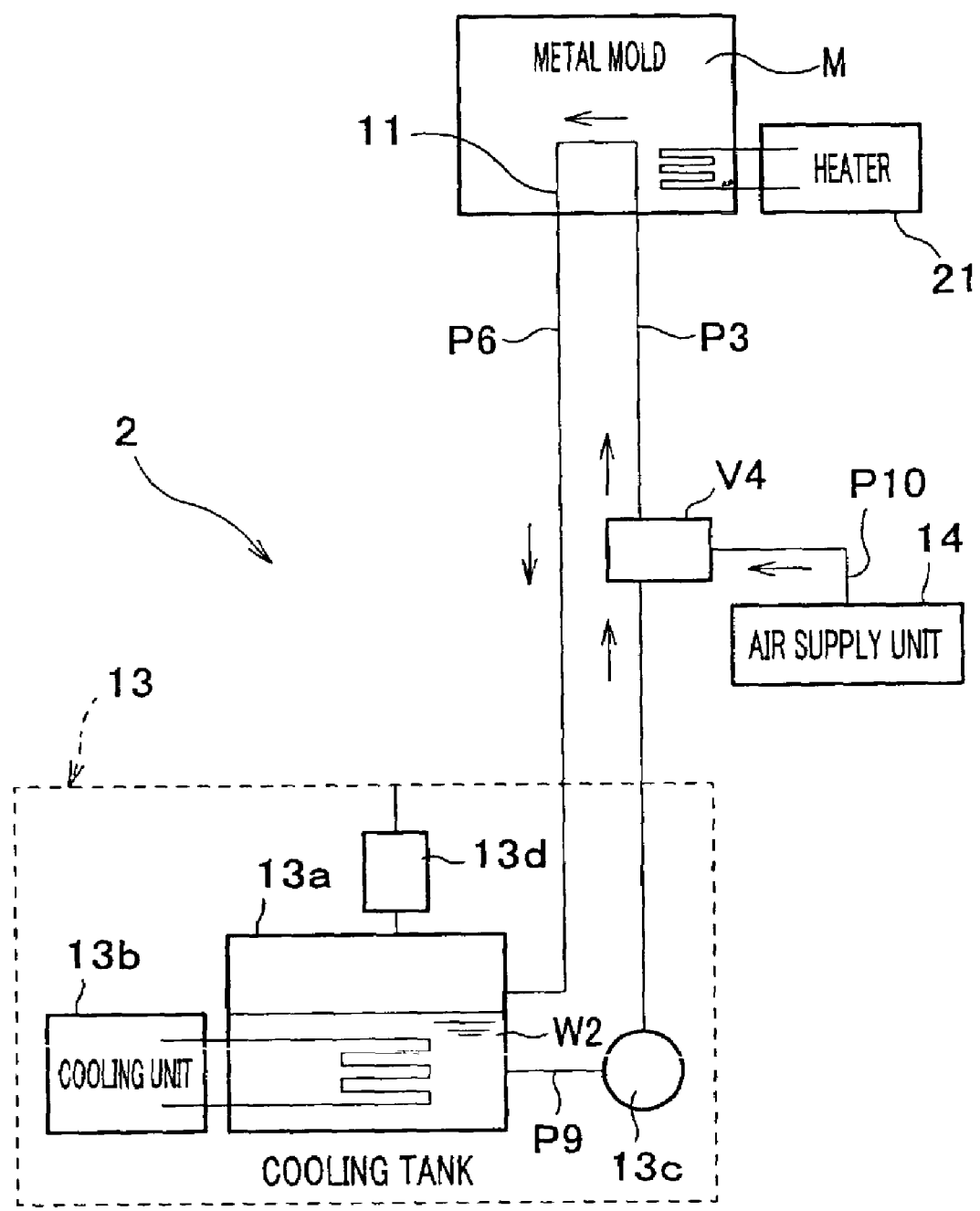
FIG. 6 is a drawing showing a structure of the heat exchange apparatus for a metal mold according to a second embodiment.

As shown in FIG. 6, a heat exchange apparatus 2 includes a heat exchange passage 11, a supply unit 13 for cold heat carrier and an air supply unit 14 for a compressed air, which are same as those of the first embodiment and a heater 21 for heating up a metal mold M. The heat exchange apparatus 2 can thus perform heat exchange for the metal mold M by switching supply of cold water W2 and heating by the heater 21.

The steps of heat exchange performed by the heat exchange apparatus 2 will now be described.

Figure 7:
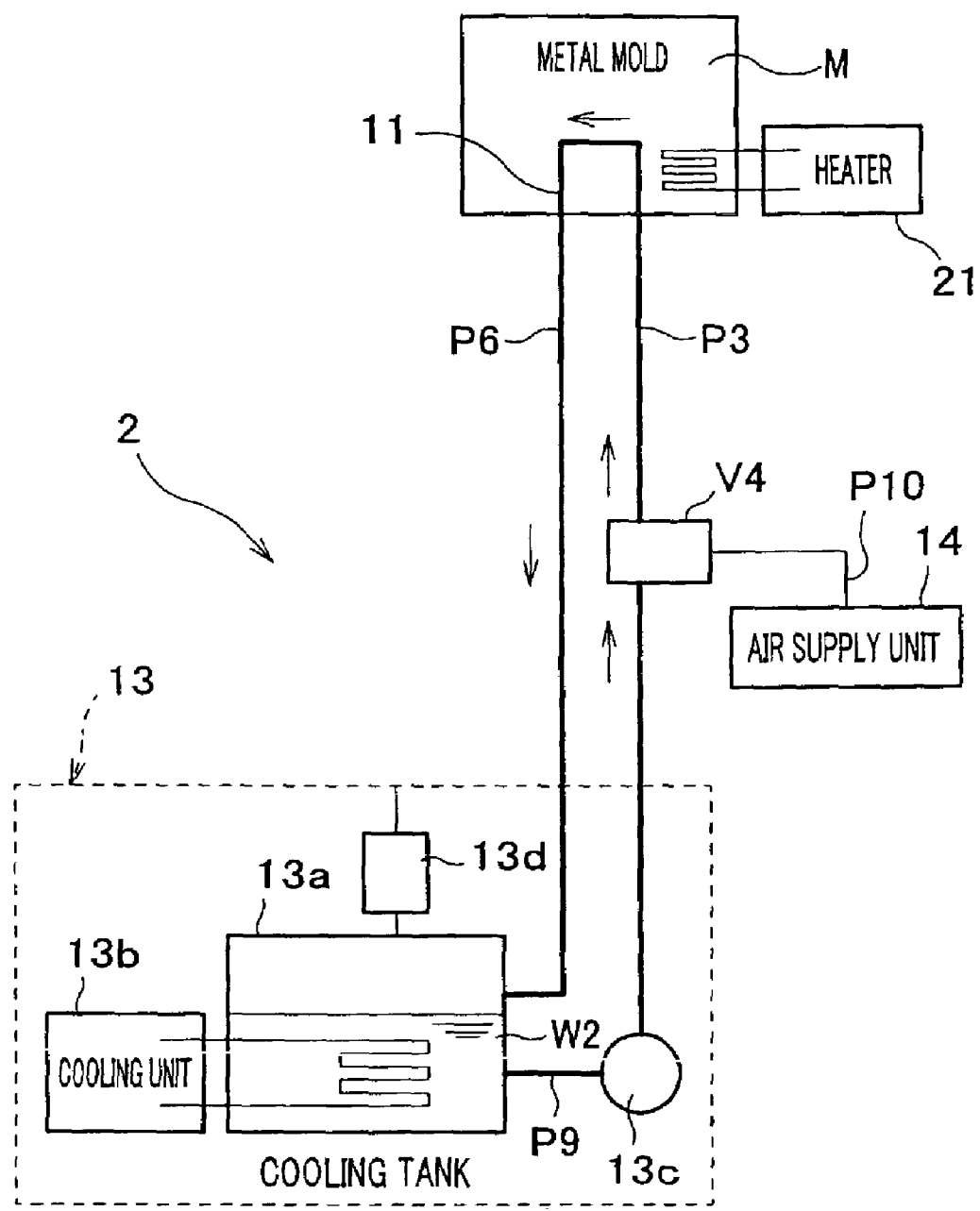
FIG. 7 is a drawing showing connection of pipes, valves, pumps and tanks while cold water is supplied to the heat exchange passage of a metal mold by a supply unit for cold heat carrier.

When the metal mold M is going to be cooled down to a predetermined low temperature, the only valve of three-way valve V4, which is connected to the air supply unit 14, is closed. And as shown in FIG. 7, the cold water W2 in a cooling tank 13a is sent to the metal mold M through pipes P9 and P3 by a pump 13c of a supply unit 13 for cold heat carrier. The cold water W2, which cools down the metal mold M passing through the heat exchange passage 11 of metal mold M, is then circulated back to the cooling tank 13a through a discharge pipe P6. After the metal mold M is cooled down to a predetermined low temperature, the pump 13c is stopped.

Figure 8:
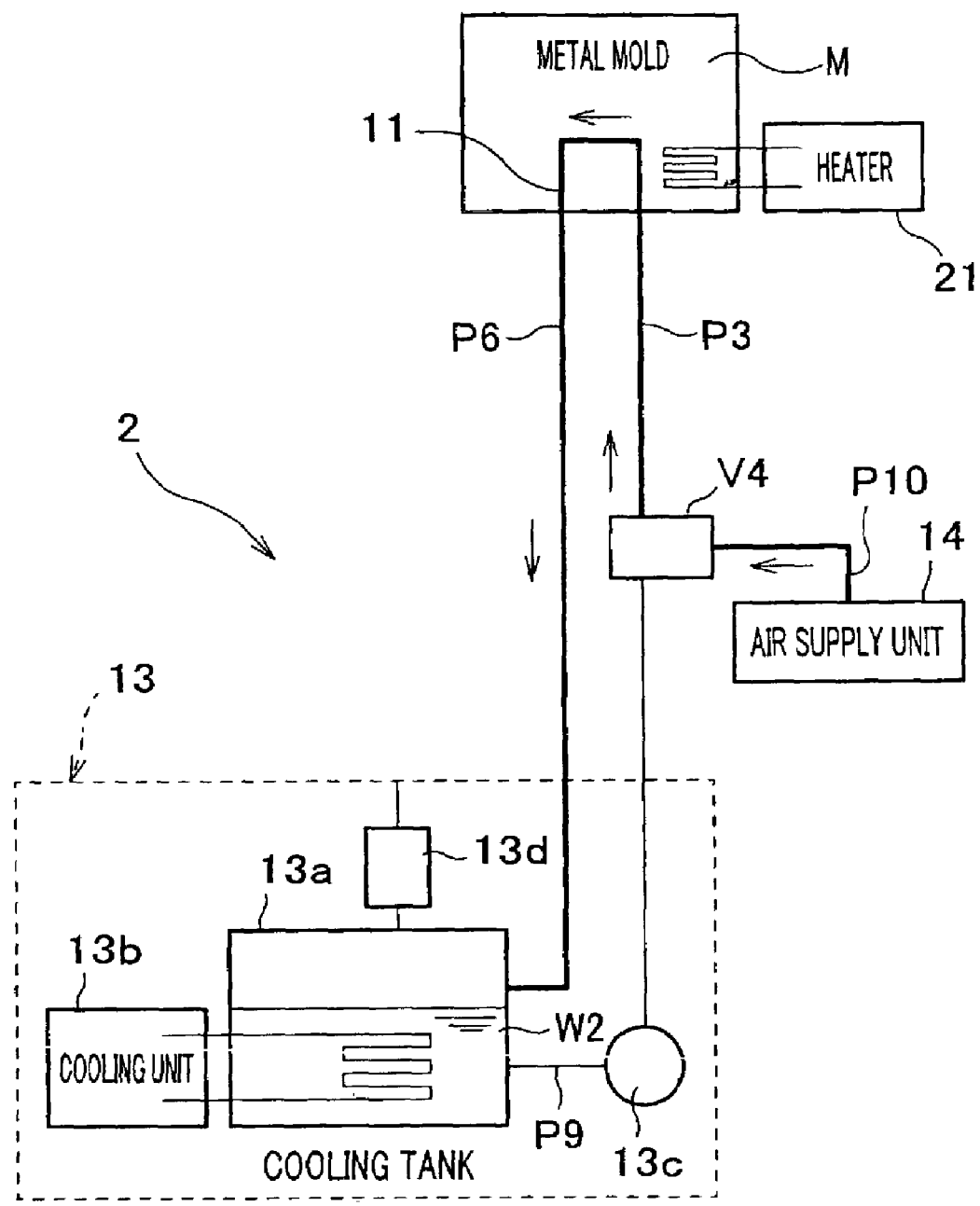
FIG. 8 is a drawing showing connection of pipes, valves, pumps and tanks while cold water remaining in a heat exchange passage is purged by compressed air.

When switching is made from supply of the cold water W2 by the supply unit 13 to heating by the heater 21, following steps are taken: switching the three-way valve 4 so that the only valve connected to the supply unit 13 is closed and subsequently supplying compressed air to the heat exchange passage 11 by the air supply unit 14. As shown in FIG. 8, the compressed air supplied by the air supply unit 14 is discharged into the cooling tank 13a through pipes P10 and P3, the heat exchange passage 11 and the pipe P6. The compressed air thus purges the cold water W2 remaining in the heat exchange passage 11 etc. into the cooling tank 13a. A pressure control valve 13d is released accordingly to control the pressure rise in the cooling tank 13 due to the compressed air discharged thereinto.

Subsequently, the metal mold M is heated up to a predetermined high temperature by the heater 21. When another cooling of the metal mold M is performed, the three-way valve 4 is switched so that the only valve connected to the air supply unit 14 is closed. Heat exchange for the metal mold M can be done by repeating the steps described above for molding of a plurality of products.

The following benefits can be attained by the second embodiment.

When the metal mold M is heated up by the heater 21, the load required for the heater 21 is relaxed and the energy efficiency is improved since the cold water W2, which cools down the metal mold M and remains in the heat exchange passage 11, is purged by the air supplied by the air supply unit 14.

The heat exchange apparatus 2 of the second embodiment is more simplified than the heat exchange apparatus 1 of the first embodiment, allowing a reduction in the cost required for the apparatus.

It will now be appreciated from the foregoing description that the present invention is not limited to the exemplary embodiment discussed above and may be carried out in various modified forms.

Figure 9:
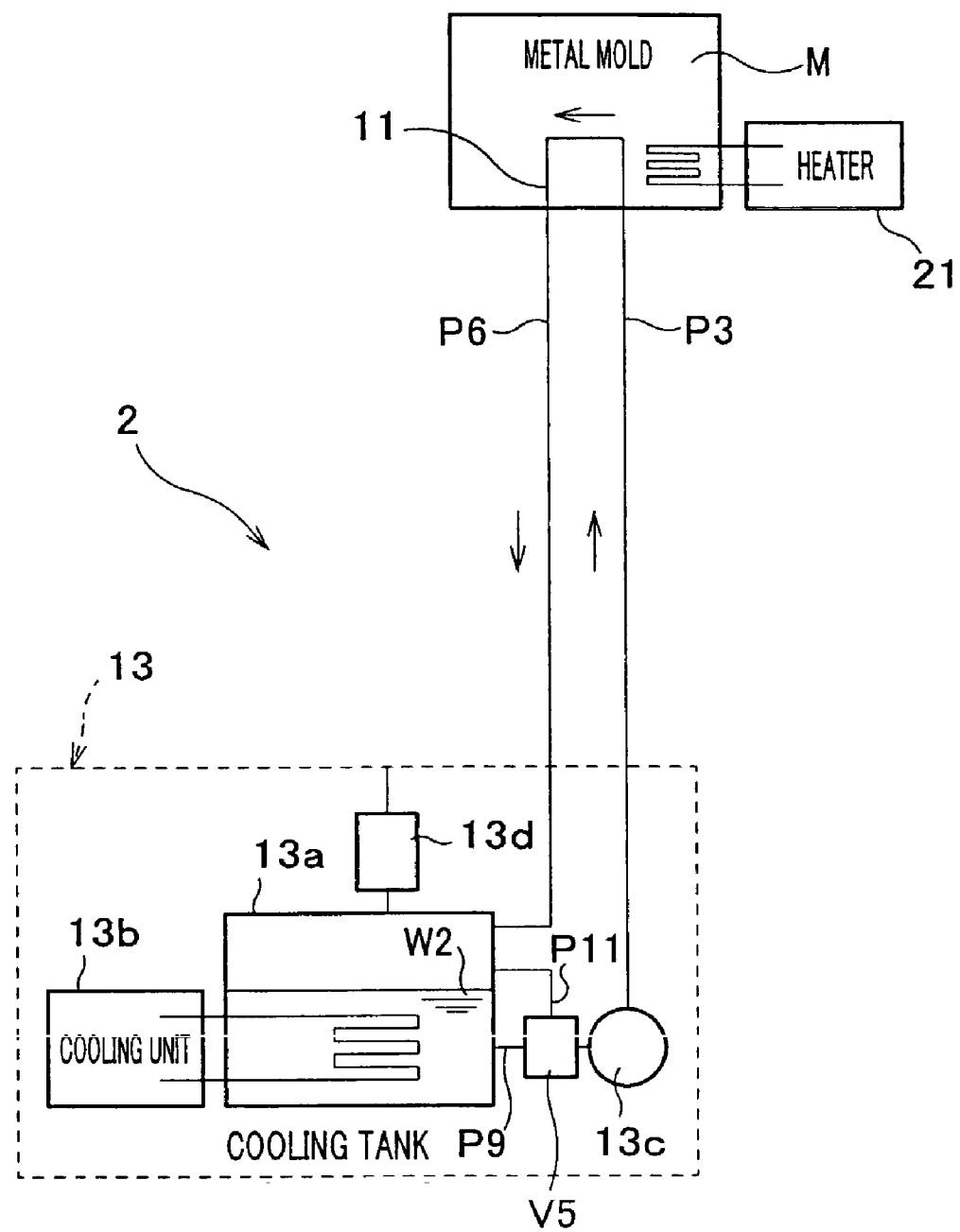
FIG. 9 is a drawing showing a structure of the heat exchange apparatus for a metal mold according to another embodiment.

The present invention is not limited to the second embodiment, in which the air supply unit 14 purges the water W2 remaining in the heat exchange passage 11 etc. but may utilize the pump 13c in order to supply the air to the metal mold M. In this case, as shown in FIG. 9, a new pipe P11 which is connected to an upper portion of the cooling tank 13a is prepared and a new three-way valve V5 is introduced, through which this pipe P11 and the pipe P9 are connected. When the air is supplied to the metal mold M, the new three way valve V5 is switched so that the air in the cooling tank 13a is supplied therefrom through the new pipe P11 and the pipe P9. In this arrangement, the water W2 remaining in the heat exchange passage 11 etc. is not only forced to move therefrom but also sucked into the cooling tank 13a due to the pressure drop therein. This arrangement can also discharge the water W2 remaining in the heat exchange passage 11 of metal mold M and provide a simpler heat exchange apparatus than those of the first and second embodiments, thereby enabling a cost reduction.

What is claimed is:

1. A method for performing heat exchange for a metal mold by a heat exchange apparatus, said apparatus comprising:
    a heat exchange passage provided for said metal mold;
    a first supply unit for supplying a hot heat carrier to said heat exchange passage;
    a second supply unit for supplying a cold heat carrier to said heat exchange passage;
    a plurality of valves;
    a plurality of pipes; and
    a plurality of air supply units for supplying air to said heat exchange passage so that said hot and cold heat carriers are purged when supply of said hot and cold heat carriers is switched,
    said method comprising the steps of:
    heating said metal mold to a predetermined high temperature with said hot heat carrier supplied to said heat exchange passage by said first supply unit;
    stopping supply of said hot heat carrier supplied by said first supply unit;
    filling a melted resin into a cavity of said metal mold;
    purging said hot heat carrier remaining in said heat exchange passage by air supplied by at least one of said plurality of air supply units;
    cooling said metal mold to a predetermined low temperature with said cold heat carrier supplied to said heat exchange passage by said second supply unit;
    stopping supply of said cold heat carrier supplied by said second supply unit; and
    extracting a cured product from said metal mold,
    wherein a first air supply unit from said plurality of air supply units purges said hot heat carrier and a second air supply unit from said plurality of air supply units purges said cold heat carrier.

2. A heat exchange apparatus for a metal mold comprising:
    a heat exchange passage provided for said metal mold;
    a first supply unit for supplying a hot heat carrier to said heat exchange passage;
    a second supply unit for supplying a cold heat carrier to said heat exchange passage;
    a plurality of valves; and
    a plurality of pipes,
    said heat exchange apparatus which performs heat exchange for said metal mold by supplying said hot and cold heat carriers to said heat exchange passage switching alternately,
    wherein said heat exchange apparatus further comprises a plurality of air supply units for supplying air to said heat exchange passage so that said hot and cold heat carriers are purged when supply of said hot and cold heat carriers is switched, and
    wherein a first air supply unit from said plurality of air supply units purges said hot heat carrier and a second air supply unit from said plurality of air supply units purges said cold heat carrier.

3. A heat exchange apparatus for a metal mold comprising:
    a heat exchange passage provided for said metal mold;
    a first supply unit for supplying a hot heat carrier to said heat exchange passage;
    a second supply unit for supplying a cold heat carrier to said heat exchange passage;
    a plurality of valves; and
    a plurality of pipes,
    said heat exchange apparatus which performs heat exchange for said metal mold by supplying said hot and cold heat carriers to said heat exchange passage switching alternately,
    wherein said heat exchange apparatus further comprises a plurality of air supply units for supplying air to said heat exchange passage so that said hot and cold heat carriers are purged when supply of said hot and cold heat carriers is switched,
    wherein said first supply unit comprises hot water as said hot heat carrier, a heating tank, a first heater, a first pump, a first pressure control valve and a first pipe,
    said second supply unit comprises cold water as said cold heat carrier, a cooling tank, a cooling unit, a second pump, a second pressure control valve and a second pipe,
    said plurality of valves comprise a first three-way valve for switching supply of said hot and cold heat carriers, a second three-way valve for switching discharge of said hot and cold heat carriers, a third three-way valve for switching air in order to purge said hot heat carrier and a fourth three-way valve for switching air in order to purge said cold heat carrier, and
    said plurality of pipes comprise a plurality of supply pipes and a plurality of discharge pipes.

4. A heat exchange apparatus for a metal mold according to claim 1, wherein each of said first and second supply units further comprises a bypass valve and each of said first and second pumps is continuously operated.

5. A heat exchange apparatus for a metal mold according to claim 1, wherein said apparatus further comprises a control unit for controlling said second three-way valve and temperature sensors for measuring temperatures of said hot water and said cold water flowing out of the heat exchange passage, and said control unit determines to which of said heating and cooling tanks said hot water and said cold water are circulated back based on said temperatures detected by said temperature sensors.

6. A heat exchange apparatus for a metal mold comprising:
- a heat exchange passage provided for said metal mold;
- a first supply unit for supplying a hot heat carrier to said heat exchange passage;
- a second supply unit for supplying a cold heat carrier to said heat exchange passage;
- a plurality of valves; and
- a plurality of pipes,
- said heat exchange apparatus which performs heat exchange for said metal mold by supplying said hot and cold heat carriers to said heat exchange passage switching alternately,
- wherein said heat exchange apparatus further comprises a plurality of air supply units for supplying air to said heat exchange passage so that said hot and cold heat carriers are purged when supply of said hot and cold heat carriers is switched,
- wherein said first supply unit comprises hot oil as said hot heat carrier, a heating tank, a first heater, a first pump, a first pressure control valve and a first pipe,
- said second supply unit comprises cold oil as said cold heat carrier, a cooling tank, a cooling unit, a second pump, a second pressure control valve and a second pipe,
- said plurality of valves comprise a first three-way valve for switching supply of said hot and cold heat carriers, a second three-way valve for switching discharge of said hot and cold heat carriers, a third three-way valve for switching air in order to purge said hot heat carrier and a fourth three-way valve for switching air in order to purge said cold heat carrier, and
- said plurality of pipes comprise a plurality of supply pipes and a plurality of discharge pipes.

* * * * *